United States Patent [19]

Grauman et al.

[11] Patent Number: 4,680,961

[45] Date of Patent: Jul. 21, 1987

[54] SYSTEM AND METHOD FOR ICE MOVEMENT DETECTION IN DETERMINATION OF ICE BREAKUP

[76] Inventors: R. J. Grauman; G. W. Sponagle; T. W. Rachuk, all of Wellsdale Research Limited, 6912 - 82 Avenue, Edmonton, Alberta T6B 0E7, Canada

[21] Appl. No.: 823,038

[22] Filed: Jan. 27, 1986

[51] Int. Cl.$^4$ ............................................. G01W 1/00
[52] U.S. Cl. ................................ 73/170 R; 340/601; 340/870.16
[58] Field of Search ............... 73/170 R, 170 A, 768, 73/799, 432.1, 866; 340/540, 601, 690, 580, 870.16; 33/125 R, 125 B

[56] References Cited

U.S. PATENT DOCUMENTS 3,477,019 11/1969 Hartmann .................. 340/690 X
4,300,121 11/1981 Fritzche ..................... 340/601 X
4,481,514 11/1984 Beukers et al. .............. 73/170 R Primary Examiner—Charles A. Ruehl
Attorney, Agent, or Firm—William R. Hinds

[57] ABSTRACT

Method and system are provided for detecting and monitoring first ice movement in frozen rivers as an indicator of breakup progression to assist in forecasting the timing of a breakup event an another location. They are especially beneficial in detecting ice movement at remote and poorly accessible locations. Movement is detected by an array of sensors connected with the in situ ice cover, the sensor signals being logged in a data collection platform or the like at the site. To provide real time data, the logged data is transmitted to a data bank by, e.g. satellite communications, and the data base may be interrogated at intervals to monitor the ice movement status. Different forms of sensors and sensor arrangements are disclosed, such as capstan type, pull-switch type, etc.

14 Claims, 4 Drawing Figures

SHAFT POSITION ELECTRONICS → DCP/RTU/DL

SYSTEM AND METHOD FOR ICE MOVEMENT DETECTION IN DETERMINATION OF ICE BREAKUP

FIELD OF THE INVENTION

On northern rivers, one of the most objective indicators of ice breakup progression, which can assist in forecasting the timing of a breakup event, is the time of first ice movement. In remote and poorly accessible locations where ice jams form rapidly and produce disastrous flood conditions, there is needed some type of ice movement detection system and method. This invention relates to such a system and such a method.

BACKGROUND

Ice jam formation and release during spring breakup can produce unusually high water levels and some of the most dynamic natural events on large northern rivers. These events can occur much more frequently and often produce sudden and considerably higher stages than open water floods. The Athabasca River near Fort McMurray, Alberta, Canada, is one such location where ice jams occur frequently and occasionally produce disastrous conditions. Fort McMurray is located in a deep valley at the confluence of the Athabasca and Clearwater Rivers. The history of ice jam flooding and observations of breakup at this location have been documented since the 1800's. The largest flood on record due to ice jamming occurred in 1875, and the most recent event which resulted in approximately $7,000,000 of damage occurred in 1977. Over the past ten years, a cooperative research program has been undertaken to characterize the breakup and resulting ice jams. The ultimate goal of the program is to predict the timing of breakup and the maximum stage, should a jam occur. An objective indicator of the progress of the breakup is the date of first ice movement.

The invention of this application in at least some of its aspects is exemplified by an ice movement detection station installed along a remote reach of the Athabasca River upstream of Fort McMurray, the purpose of which was to detect any early or untimely breakup. In accordance with this embodiment of the invention, the station consisted of an array of sensors placed within the in situ ice cover, the sensors in turn being connected to a data collection platform (DCP) or the like, and any shift in the ice cover at the station location being transmitted to the geostationary operational environmental satellite (GOES). An understanding of the features, uses and various aspects of the invention will be facilitated through a description of this exemplary station, as well as its location, surroundings and operation.

The Athabasca River has its source in the Rocky Mountains and flows east and north to Lake Athabasca. From the town of Athabasca, located 400 kilometers upstream of Fort McMurray, the river flows northward. The drainage basin area above Athabasca is 76,664 square kilometers and above Fort McMurray it is 105,206 square kilometers. For 140 kilometers upstream of Fort McMurray, the Athabasca River flows through a series of rapids. In this region, the river is entrenched with steep banks exceeding 10 meters, a top width of 450 meters and an average slope of 0.0010. At the Clearwater River confluence at Fort McMurray, the Athabasca River abruptly changes character. The channel pattern is partially entrenched and occupied by numerous mid-channel bars and islands. The width increases to approximately 750 meters, and the slope decreases to about 0.00023, and the bankfull height decreases to about 7 meters. The ice cover forms on the Athabasca River between late October and mid November, and the river remains ice covered until mid April.

In the Athabasca basin upstream of Fort McMurray, the progression of breakup is documented using a fixed wing aircraft. The surveillance flight schedules are based on meteorological change and the response of the contributing basins to snow melt. There is a stream gauging station on the Athabasca River at Athabasca. This station provides an historical record of breakup upstream of Fort McMurray, and it is the nearest location upstream where ice conditions can be regularly monitored prior to breakup. An obvious sharp increase in stage is often recorded on the chart and this is often an indication of first ice movement. However, existing records are questionable because of the inconsistent definitions of breakup, and most data were either destroyed or affected by a rapid change in stage and the movement of the ice during the actual breakup event.

On northward flowing rivers such as the Athabasca River, breakup generally progresses from south to north. Unfortunately upstream of Fort McMurray, the progression is disrupted by fourteen sections of steep rapids. The rapid sections can break up even when there is only a small increase in discharge prior to the main runoff event. The high channel slopes result in large velocities and shear stresses which trigger a localized breakup process. Downstream of the rapid section, small jams form, alternately move and reform and accumulate into one large one. Such jams have been observed to exceed 25 kilometers in length, and they can produce increases which range between eight and twelve meters above normal open water levels. The location and stage of the ice jams upstream of Fort McMurray largely determine the momentum and the ice run at Fort McMurray and whether it will be moderate or severe. Conceivably a localized breakup upstream within the rapid sections could advance toward Fort McMurray and result in a possible ice jam. A frequency analysis of water levels at Fort McMurray, which span 103 years and included ice jam events, indicates the 1-in-100 year flood level due to ice jams is 252 meters which is approximately seven meters above open water flood levels.

The site chosen for the ice movement station is located along the Athabasca channel approximately thirty-eight kilometers upstream of the confluence of the Athabasca and Clearwater Rivers at Fort McMurray. The site is located along a straight reach and at a very uniform section immediately downstream of a sharp bend. The width of the channel is approximately 450 meters and the mean depth prior to breakup is 1-2 meters throughout the section. The banks are high, near vertical and composed of bedrock. The site is located midway between two separate rapid sections where the channel slope is 0.0015. Based on observations over several years prior to and during breakup, the main ice run would be temporarily delayed due to the sharp bend or the ice cover would remain intact until the main ice run advanced to this location. These regular characteristics of the site make it a favorable location for the successful detection of an advancing breakup.

The station consisted of an array of sensors placed within the ice cover, temperature and precipitation measuring instruments, and a DCP to store and transmit the data. The major instrumenation was anchored on the river bank above possible flood levels. The array of sensors, installed in the "active" section across the river and activated by movement of anchors embedded in the ice, were placed within the in situ ice cover. Ice movement was detected by movement of anchors. One of the anchors was attached to a capstan device to measure the extent of travel up to 100 meters. Temperature and precipitation were measured with standard meteorological instruments.

The status of the station and meteorological and diagnostic data were transmitted every four hours. On a separate GOES channel for emergency transmissions, random checks of the system were at approximately eight hour intervals. In the event of a sensor break away, two emergency transmissions were made immediately. The DCP transmitted the data via GOES to Wallops Island, Va., United States of America. The Command and Data Acquisition Station in Wallops, Va., was interrogated from Edmonton, Alberta, Canada with a 780 series Model 785 Texas Instruments Portable Data Terminal at regular intervals by telephone and the status of the detectors and sensors monitored. National Environmental Satellite Service (NESS) can be accessed from any location that has a telephone and source of AC power.

Considering the sensors in more detail, an array of five switch sensors were placed on the river bank. These sensors were connected by polypropylene ropes to anchors in the river ice. the anchors were connected to the sensors such that a predetermined force was necessary to activate the switches. The switches were pull-apart switch sensors. Additionally, a capstan consisting of a drum, approximately one meter in circumference, wound with polypropylene rope, was connected to a multiturn shaft encoder. The Model 501A incremental shaft encoder (Synergetics International, Inc., Boulder, Colo., U.S.A.) is a general purpose instrument used to digitize the position of any slowly rotating shaft. It is a simple, reliable electromechanical device. The shaft encoder allowed a resolution of ten centimeters of movement over a distance limited only by the amount of rope that could be placed over the drum. When all the polypropylene rope was unspooled, the anchor detached.

The polypropylene ropes were held above the ice by short stakes to prevent strain that would be imposed by freezing and thawing on the surface. Precautions were taken to ensure that the ropes were well above the ice in the shore lead area.

Although not features of this invention as such, the temperature was determined with a Model 81060 air temperature sensor by Wellsdale Research Ltd., with the temperature being measured every hour and transmitted as four variables, and precipitation was determined by a tipping bucket precipitation gauge.

The real time determination of ice breakup required the use of the Geostationary Operational Environmental Satellite Data Collection System (GOES DCS). The geostationary environmental satellite system consists of a spacecraft, ground stations, central data distribution systems, and data collection platforms. The GOES DCS is a communications relay system that uses the transponder carried on the GOES spacecraft to relay UHF transmission from DCP's by S-band to ground receiving stations. The primary ground station is the command and data acquisition station located at Wallops Island, Va. Several other receiving sites are owned by various U.S. government agencies throughout the United States.

The GOES data collection system features the following capabilities:

a. Collects and distributes environmental data measured on remotely located, attended and unattended DCP's located on land, sea or in the atmosphere.

b. Has the capacity for handling at least 12,000 messages per hour from the DCP sites via the spacecraft transponder. Data transmission rate is 100 bits per second.

c. Collects all data in a six hour period.

d. Provides the capability for collecting data in a routine or emergency manner.

A data collection platform (DCP) includes a microprocessor and is capable of collecting, processing, storing and transmitting data. The DCP used in this station was a Synergetics Model 3400A. It consists of a master control module, sensor interface module, communication module, and an uninterruptible power supply. The master control module is used to supervize the collection, processing, and transmission of the data. It controls the sensor cycle, the frequency or time interval when the actual environmental sensor is read. This data is placed in the memory of the DCP for transmission at a later time. For instance, a DCP may record an environmental sensor every fifteen minutes, but this data would be transmitted through the GOES DCS only once every four hours.

The transmitter is user programmable to transmit on any of the GOES channels. We selected self-timed, random operating, or both. The self-timed transmissions require a timing source which is preprogrammed to report during a specific hour, a specific minute of that hour, and at a programmed rate over a twenty-four-hour period. Self-timed transmissions were made every four hours on a channel assigned by NESS. The random reporting transmissions are on a different frequency than the self-timed reporting and occur when a sensor threshold has been reached or exceeded. Because the random transmission channel can be used by others, random duplicated transmissions must be used. The thresholds programmed into the system were:

1. A time period of eight hours +/- a random time. (This confirmed that the system was operational).

2. The shaft encoder on the capstan turned more than 100 counts (equivalent to at least one revolution of the capstan).

3. An ice sensor released or broke.

A special feature of this installation is the use of the random transmission capability for early warning and to record the exact time of the movement. Use of the special emergency transmission required authorization from NESS and frequent monitoring.

The DCP was powered by an internal uninterruptible power supply supplemented by an external battery. The external battery was housed in a container near the DCP and provided adequate power for the test period.

Station diagnostics and status including the battery voltage and the transmitter power were determined and transmitted.

The DCP was mounted on a three meter tower to which was attached a crossed Yagi antenna aimed at the GOES satellite.

For this particular station, typical data received upon connecting to the NESS data bank at Wallops Island included groups of numbers indicative of platform identification, date and time of transmission, groups of hourly temperature coefficients, tipping bucket values, capstan shaft encoder status, and sensor switch status, plus battery voltage, forward power and reverse power. All of this data was typically received in connection with a predetermined interval transmission. The emergency transmission followed the same general format, but was condensed to report only the shaft encoder and sensor switch information. Accurate information was received for the first and subsequent significant ice movements, and for major movements. The station provided reliable real time data to detect the commencement of an ice run in advance of breakup at Fort McMurray, and this information was valuable in determining timing of breakup at Fort McMurray.

Many details of the described exemplary ice movement detection station are not critical to the invention itself. For instance, the particular combination of capstan and switch sensors is not critical, although preferred, and a workable station could use either or both types of sensors, or other types of sensors which would provide a detectable signal. The sensors may be connected to a data collection platform (DCP), remote terminal unit (RTU), or a data logger (DL). A remote terminal unit (RTU) includes a microcomputer with input/output and communication peripherals, and is able to sense, collect, process, analyze and archive real time data. The real time data can be communicated with virtually no delay, or during preset intervals, to a user. Communication can take place by means of telephone (either voice or tone), radio, or satellite. Basically an RTU which uses a satellite for communication can be considered a DCP. A data logger (DL) is a device which stores and records, or logs, information received from a sensor or sensors. Current information can be compared with the status of the sensors during earlier scans, and this information can then be displayed, stored and/or transmitted via satellite, radio or telephone. Based on the change in the status of the sensors, many alarms and tasks can be programmed into the DCP/RTU/DL.

The number of sensor arrangements on the ice is not critical, and can vary depending on location. Because the ice can move as a channel between the extremes of the shore lines, at least one detector must be connected in the section of the ice which moves. Suitable numbers and locations on the ice will vary with the site and conditions, but it is within the skill of the art to determine this.

As an alternative form of sensor, one or more conductors may be strung in a serpentine manner across the ice, and attached and/or frozen in place. The electrical continuity of the wire is checked, and should the line be broken, it would be interpreted as a break or movement in the ice. The serpentine method of laying or attaching the wire on/in the ice is to compensate for differential expansion/contraction, and small shore line movements which might otherwise break the wire and give a false reading.

The foregoing description of an exemplary station and its operation in conjunction with the ensuing description and illustration of particular features of the invention will enable those skilled in the art to understand and practice the invention.

DESCRIPTION OF THE ILLUSTRATED EMBODIMENTS

Figure 1:
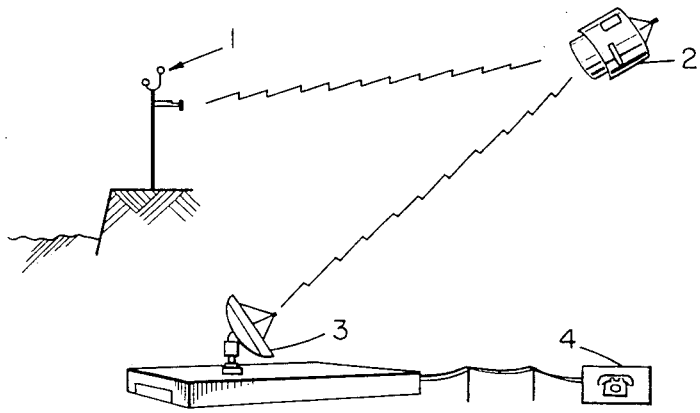
FIG. 1 diagrammatically illustrates exemplary transmission of data from an ice movement detection station via the GOES satellite system ultimately to a river forecast center.

Referring to the drawings, FIG. 1 shows a data collection platform 1 at an ice detection station transmitting data via the geostationary operational environmental satellite data collection system. Data relayed via UHF transmission from the DCP to the GOES spacecraft 2 is relayed by the spacecraft transponder by S-band to a ground receiving station 3, here shown as the command and data acquisition station located at Wallops Island, Va. Stored data can be received via telephone lines at a using center 4, here shown as the Alberta River Forecast Center. As previously described, data is transmitted at predetermined intervals and as emergency transmissions, and is accessible at will via a data terminal, such as the 780 series Model 785 portable data terminal by Texas Instruments, which is a high speed microprocessor based, thermal printing device, with an internal modem.

Figure 4:
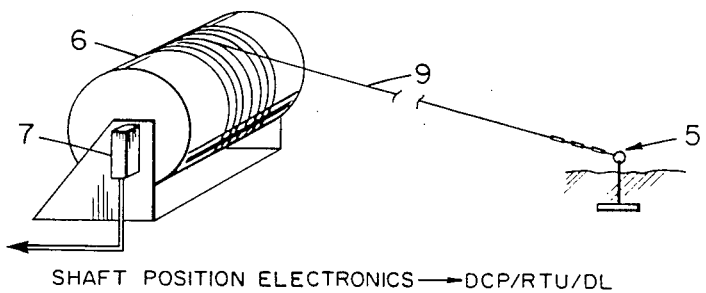
FIG. 4 diagrammatically illustrates an embodiment using a capstan type sensor with a horizontal axis, it being understood that the capstan may be alternatively oriented with its axis vertical.
Figure 2:
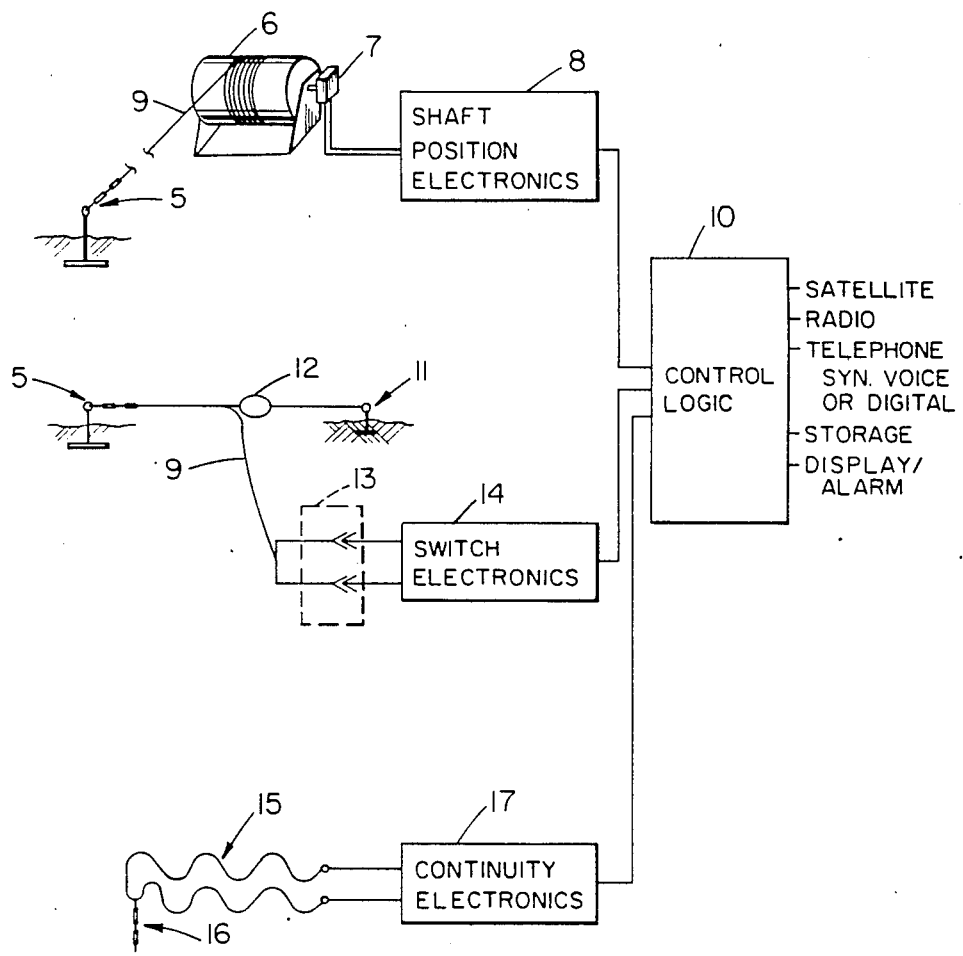
FIG. 2 diagrammatically illustrates the main components of an ice movement detection station using three different forms of sensors, it being understood that this is for illustrative purposes only, and that any one or more of the different sensors could be used alone or in combination.

FIG. 2 diagrammatically illustrates three different types of sensors connected to control logic 10, which may be a data collection platform, or remote terminal unit, or data logger, as previously described. Any or all of the different types of sensors may be used at a particular ice movement detection station. As shown, the capstan 6 is provided with a shaft encoder 7, and is wound with the sensor end of a polypropylene rope 9 which is connected at its anchor end to an ice anchor 5 embedded in the ice at a selected location in the river. The axis of the capstan may be horizontal or vertical. The shaft encoder 7 is connected via conventional shaft position electronics indicated at 8 to the control logic 10 of the DCP/RTU/DL, which in turn is capable of satellite communication, radio communication, digital or synthesized voice telephone communication, storage, or display/alarm. One important reason for using a capstan device is to differentiate between incremental and major ice movements. It is possible for the ice to move incrementally at first, indicating that breakup is imminent, but the ultimate objective is to recognize major movements. As the ice moves, the rope unwinds from the drum, causing the drum to turn. The number of rotations of the drum can be determined by electronic or mechanical/electronic devices, such as a potentiometer, a turns counter (shaft encoder) or syncro. These are well-known in the art. The number of turns of the drum is detected and is proportional to the distance of ice movement. When the rope around the drum is completely unwound, a weak link is provided to detach the rope from the capstan itself. The limit of ice movement detection depends on the amount of rope wound on the drum. The capstan device with a horizontal axis and schematically indicated connections are shown in slightly more detail in FIG. 4.

Figure 3:
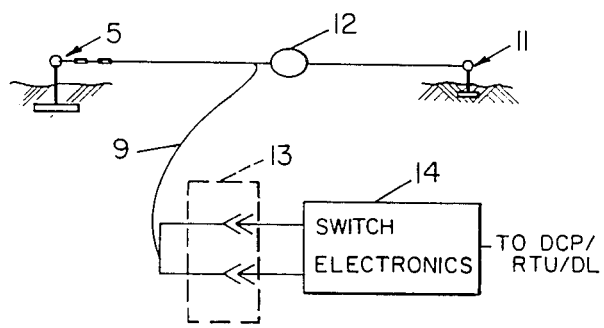
FIG. 3 diagrammatically illustrates in slightly more detail an embodiment using a pull-apart switch sensor.

The switch-type sensor is also diagrammatically illustrated in FIG. 2, and in slightly more detail in FIG. 3. As shown, the switch sensor is a simple, normally closed, pull-apart type. Many types can be used, and its function is to show continuity in the circuit when the anchors are still in place. In the typical switching arrangement illustrated, the switch 13 is connected via rope 9 to imbedded ice anchor 5, and is connected via conventional electronics 14 to control logic 10. A weak link 12 is provided between the rope and the shoreline anchor 11 so that only the expendables (rope and anchors) are swept away with the moving ice. Upon movement of the ice, the rope between the anchor and the switch is pulled tight, and the switch separates resulting in a discontinuity in the circuit, which is detected and communicated to control logic 10 via electronics 14. Slack in the rope adjacent the switch may be varied appropriate to the amount of ice movement to be detected by opening of the switch.

A wire-in-ice sensor 15 is schematically illustrated in the lower part of FIG. 2, forming part of a circuit from continuity electronics 17, and attached to the ice, as indicated schematically at 16. The sensor includes one or more conductors strung (attached, frozen) in a serpentine manner across the ice. The continuity of the wire is checked, and should the line be broken, it would be interpreted as a break or movement in the ice. The serpentine method of laying or attaching the wire on/in the ice is to compensate for differential expansion/contraction and small shoreline movements which would otherwise break the wire and give a false reading.

The foregoing description and accompanying illustrations are set forth as explanatory and exemplary of aspects, features and operation of embodiments of the invention. The invention itself is as defined in the subjoined claims, construed in the light of the foregoing explanation and illustrations.

We claim:

1. A method of detecting ice movement automatically in a frozen river or the like, comprising embedding at least one anchor in the ice relatively away from the river banks at a selected location of potential ice movement as an indication of ice breakup, connecting the embedded anchor via a flexible line to a sensor for generating a detectable electrical signal upon predetermined movement of the anchor and line relative to the sensor, locating the sensor at a fixed location removed from the movable ice such that predetermined movement of the ice and the embedded anchor will move said line to cause said sensor to generate an electrical signal, and detecting said electrical signal.

2. A method as claimed in claim 1 wherein information as to said electrical signal is transmitted by wireless signal and detected at a remote location.

3. A method as claimed in claim 2 wherein said sensor includes capstan means about which the sensor end of said line is wound such that movement of said anchor and line causes turning movement of said capstan means, and said generated signal is indicative of the amount of turning movement of said capstan means and hence the amount of ice movement.

4. A method as claimed in claim 2 wherein said sensor includes normally closed pull-apart switch means in a circuit such that movement of said anchor and line opens the switch.

5. A method as claimed in claim 2 wherein said wireless signal is transmitted via satellite communications.

6. A method as claimed in claim 2 wherein said sensor is operatively connected with computer based processing, storing and transmission means arranged to collect and process said electrical signal, to transmit said information at predetermined intervals, and to randomly transmit said information upon occurrence of a predetermined sensor threshold condition.

7. A system for detecting ice movement automatically in a frozen river or the like, comprising ice movement detection means connected with the ice at a selected location of potential ice movement as an indication of ice breakup, said detection means including means for causing a detectable electrical signal upon predetermined movement of the ice, means for detecting said electrical signal, and means for transmitting information concerning said electrical signal to a monitoring station.

8. A system as claimed in claim 7 wherein said transmitting means is programmed to transmit information at predetermined intervals and randomly upon occurrence of a threshold condition of said electrical signal.

9. A system as claimed in claim 7 wherein said electrical signal is a change in the continuity of a circuit caused by ice movement.

10. A system as claimed in claim 9 wherein said detection means includes a wire forming part of an electrical circuit and attached to and extending along the ice in a serpentine configuration.

11. A system as claimed in claim 9 wherein said detection means includes an anchor embedded in the ice at a location of potential ice movement relatively away from the river bank, and a sensor located at a fixed location removed from the movable ice and connected with said embedded anchor via a flexible line for generating said detectable electrical signal upon predetermined movement of the anchor and line relative to the sensor.

12. A system as claimed in claim 11 wherein said sensor includes a pull-apart switch in said circuit and connected with said flexible line.

13. A system as claimed in claim 11 wherein said sensor includes capstan means about which the sensor end of said flexible line is wound such that movement of said anchor and line causes turning movement of said capstan means, and said means for causing a detectable electrical signal is responsive to turning movement of said capstan means to generate a signal indicative of the amount of turning movement of said capstan means and hence the amount of ice movement.

14. A system as claimed in claim 13 wherein said means for detecting said electrical signal comprises computer based means for receiving and processing said electrical signal, and for causing said transmitting means to transmit information at predetermined intervals and randomly upon occurrence of a threshold condition of said electrical signal indicative of a predetermined ice movement so as to permit timed monitoring of incremental ice movement between predetermined intervals and immediate monitoring of major ice movement.

* * * * *